May 31, 1955  L. E. TAPP  2,709,510
TYPEWRITER
Filed Sept. 5, 1952  10 Sheets-Sheet 8
Fig. 13.
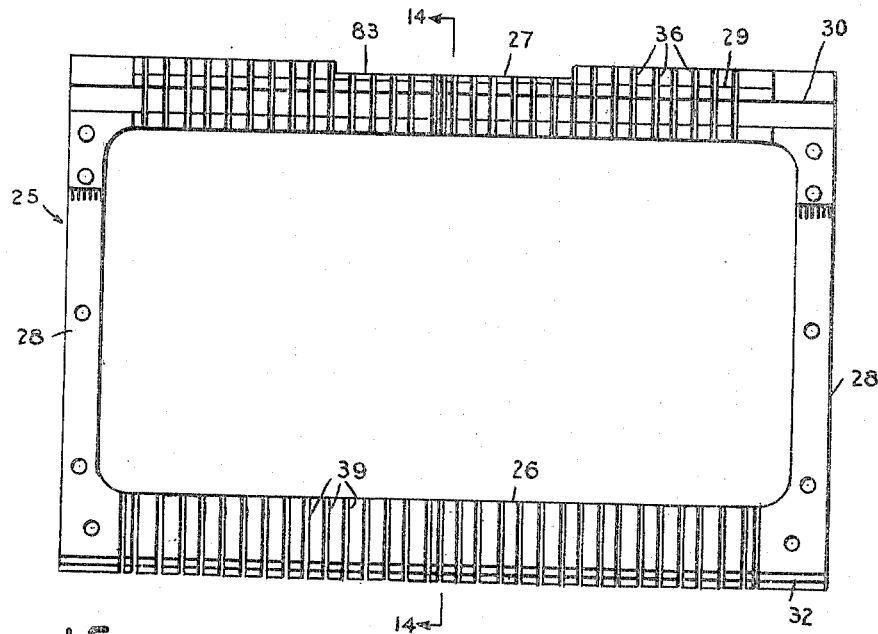
Fig. 15.
Fig. 16.
Fig. 24.
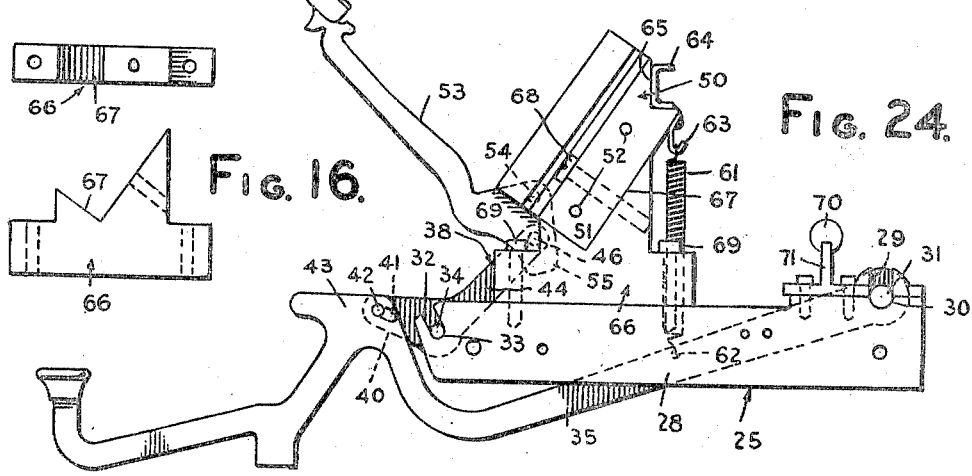
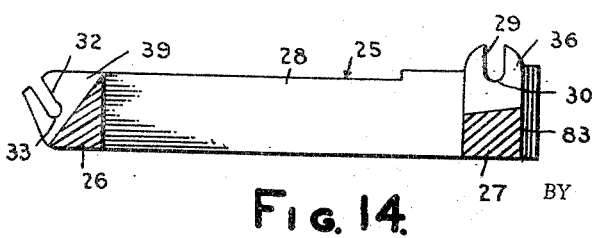
Fig. 14.
INVENTOR
LORA E. TAPP
BY W. J. Eccleston
ATTORNEY

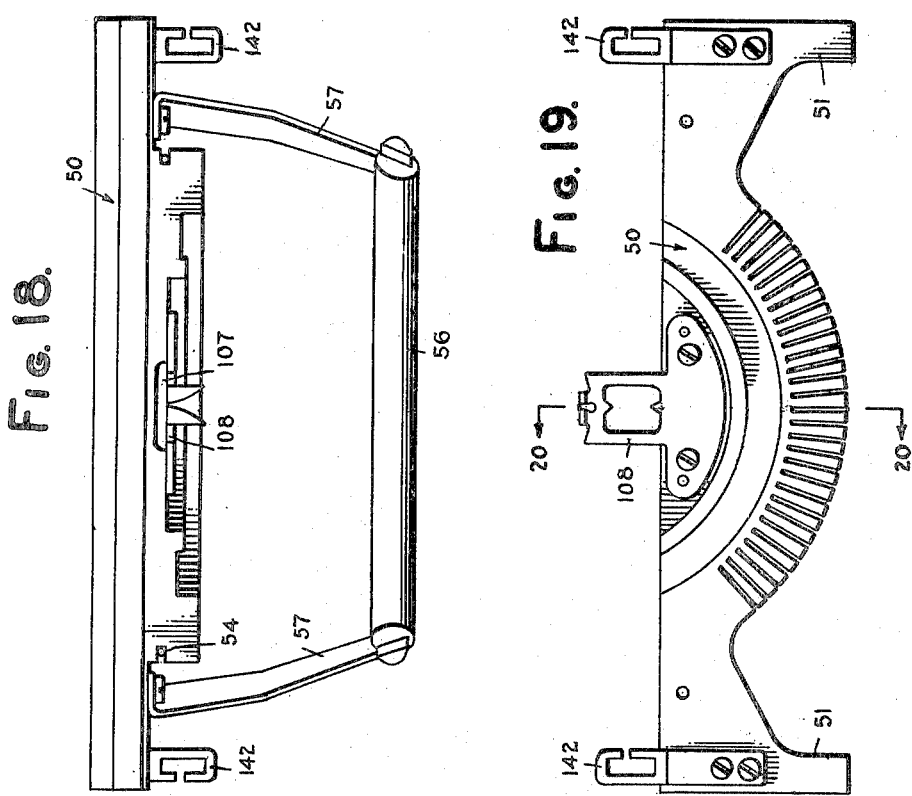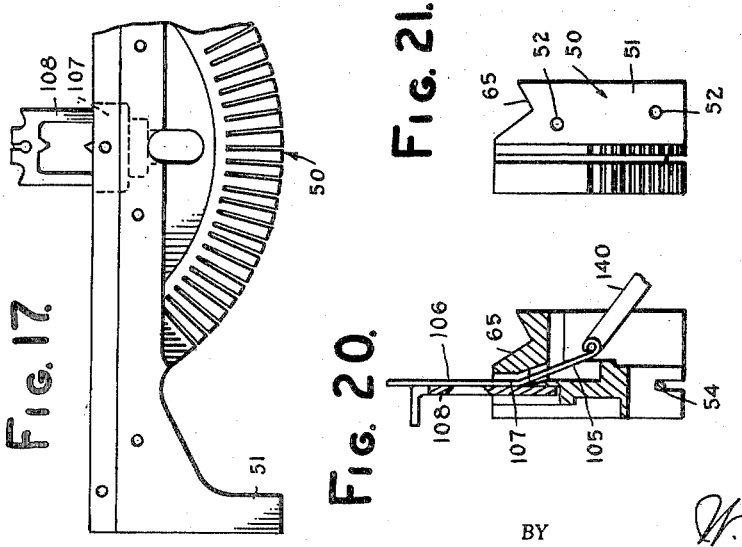

May 31, 1955
L. E. TAPP
2,709,510
TYPEWRITER
Filed Sept. 5, 1952
10 Sheets-Sheet 10
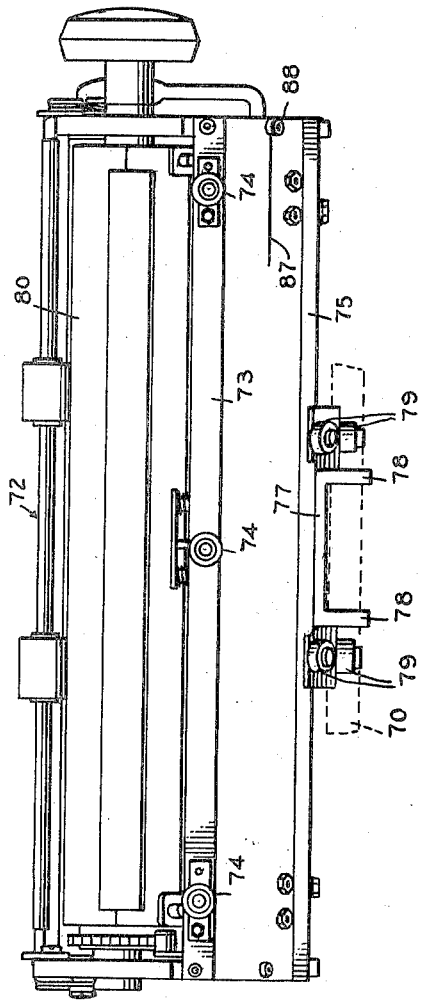
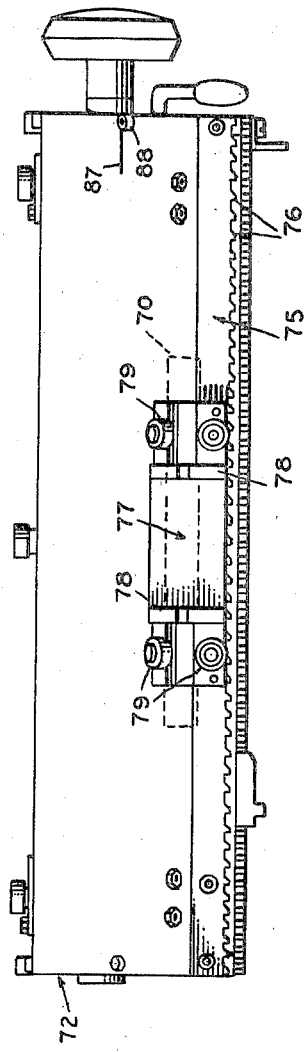
INVENTOR
LORA E. TAPP
BY W. J. Eccleston
ATTORNEY United States Patent Office 2,709,510
Patented May 31, 1955

2,709,510

TYPEWRITER

Lora Evans Tapp, Clarksville, Ind.; Lloyt E. Tapp, Loretta Sue Tapp, Larry Wayne Tapp, and Lucille Marie Tapp, sole heirs of said Lora Evans Tapp, deceased Application September 5, 1952, Serial No. 308,176

19 Claims. (Cl. 197—22)

(Granted under Title 35, U. S. Code (1952), sec. 266)

The invention described herein, if patented, may be manufactured and used by or for the Government for governmental purposes, without the payment to me of any royalty thereon.

My invention relates to typewriters.

A primary object of the invention is to provide a typewriter which is extremely rugged and durable in construction, so as to be capable of standing hard usage, and particularly well adapted for use by military personnel in the field for typing messages and the like.

A further object is to provide a simplified typewriter embodying a minimum number of parts, constructed and arranged so that the typewriter is very easy to service, assemble and disassemble without employing skilled typewriter mechanics.

A further object is to provide a typewriter which will be considerably cheaper to manufacture than conventional typewriters, due to the fact that complicated machining and assembly operations have been minimized, and the major operating components of the machine are connected with a horizontal support or mounting frame, which is independent from the main frame of the typewriter.

A further object is to provide a typewriter having a novel and simplified universal mechanism arranged forwardly of and above the sub-levers and readily accessible from the front of the machine.

A still further object of the invention is to provide a novel and simplified ribbon reversing and feed mechanism for a typewriter of the above-mentioned character.

Figure 1:
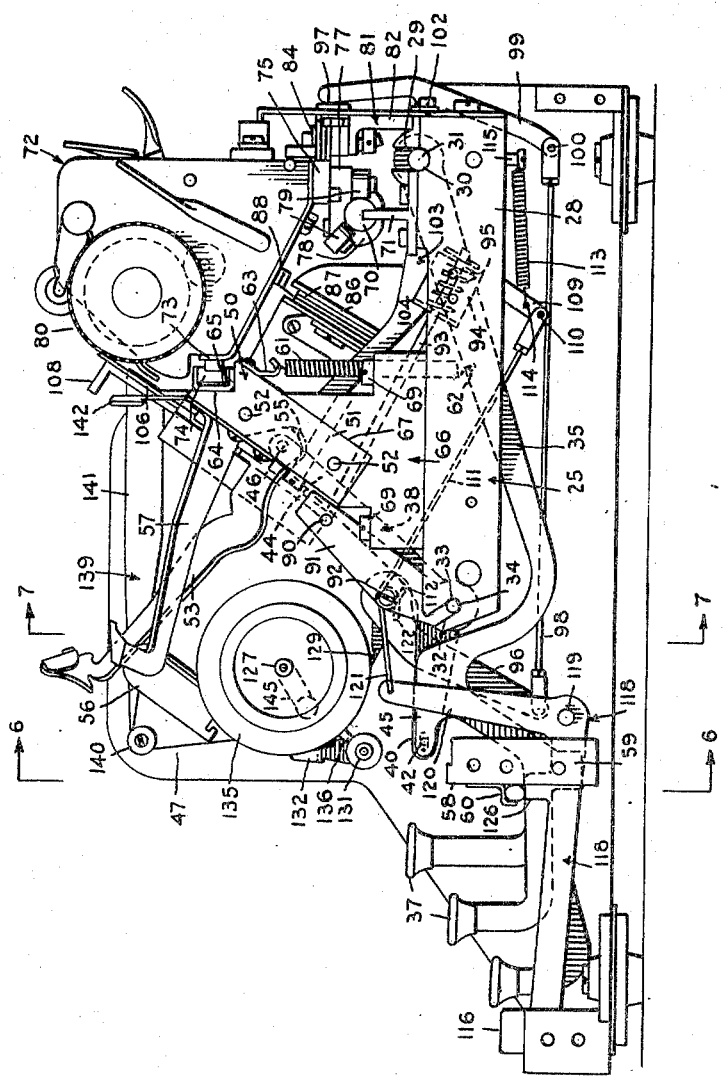
Figure 2:
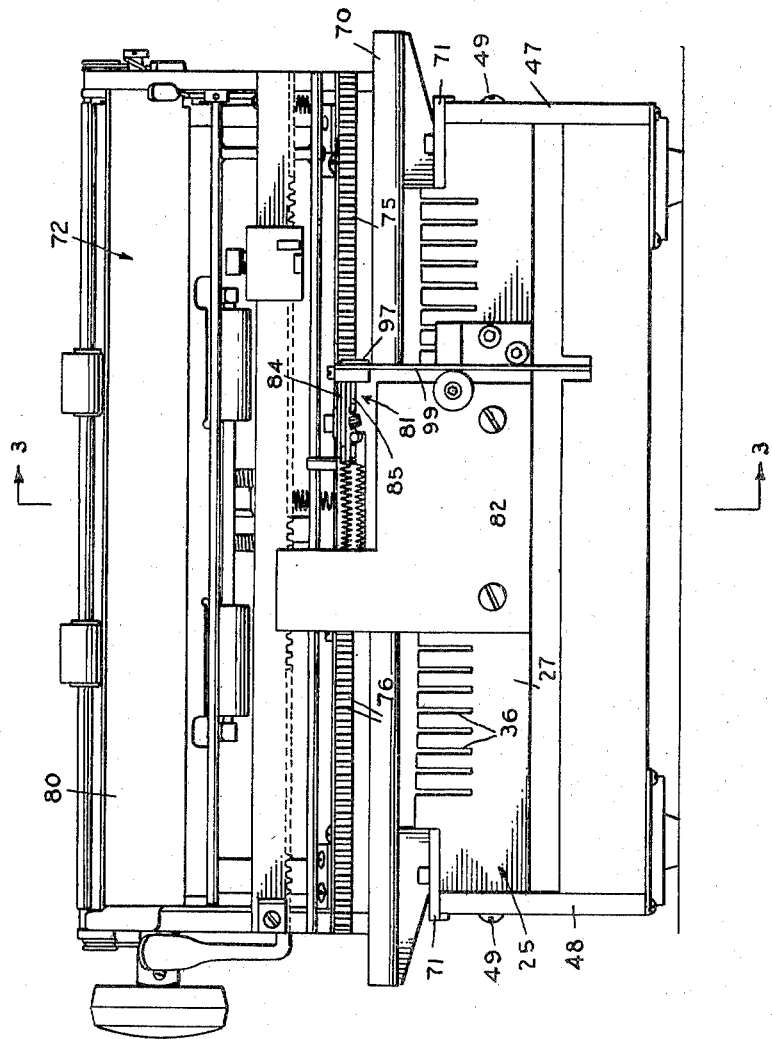
Figure 3:
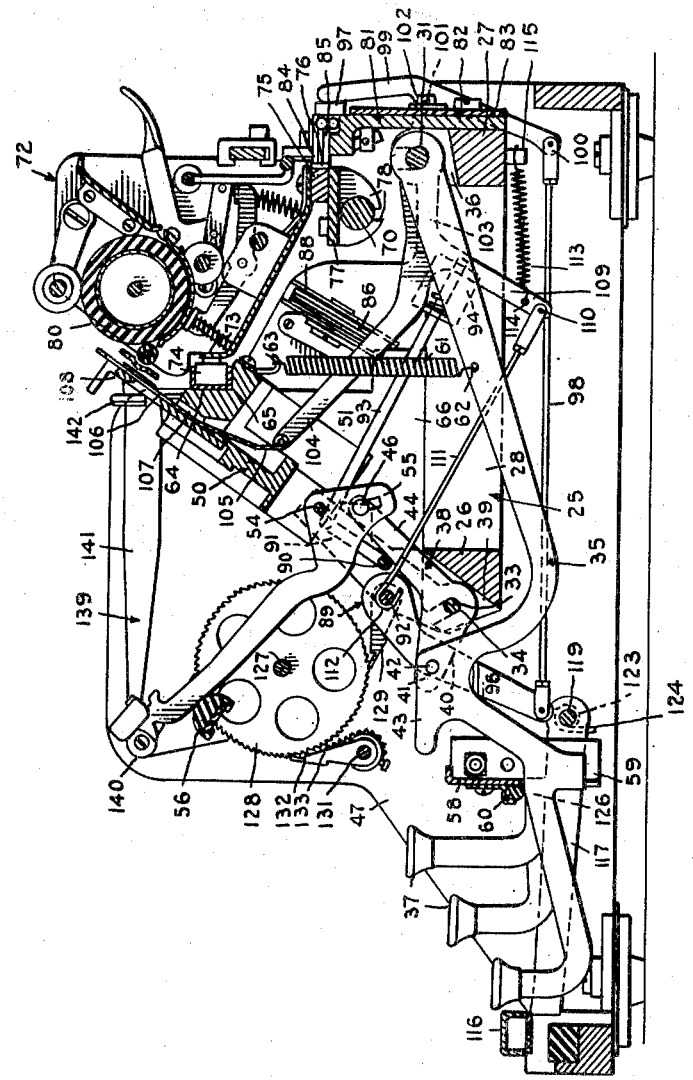
Figure 4:
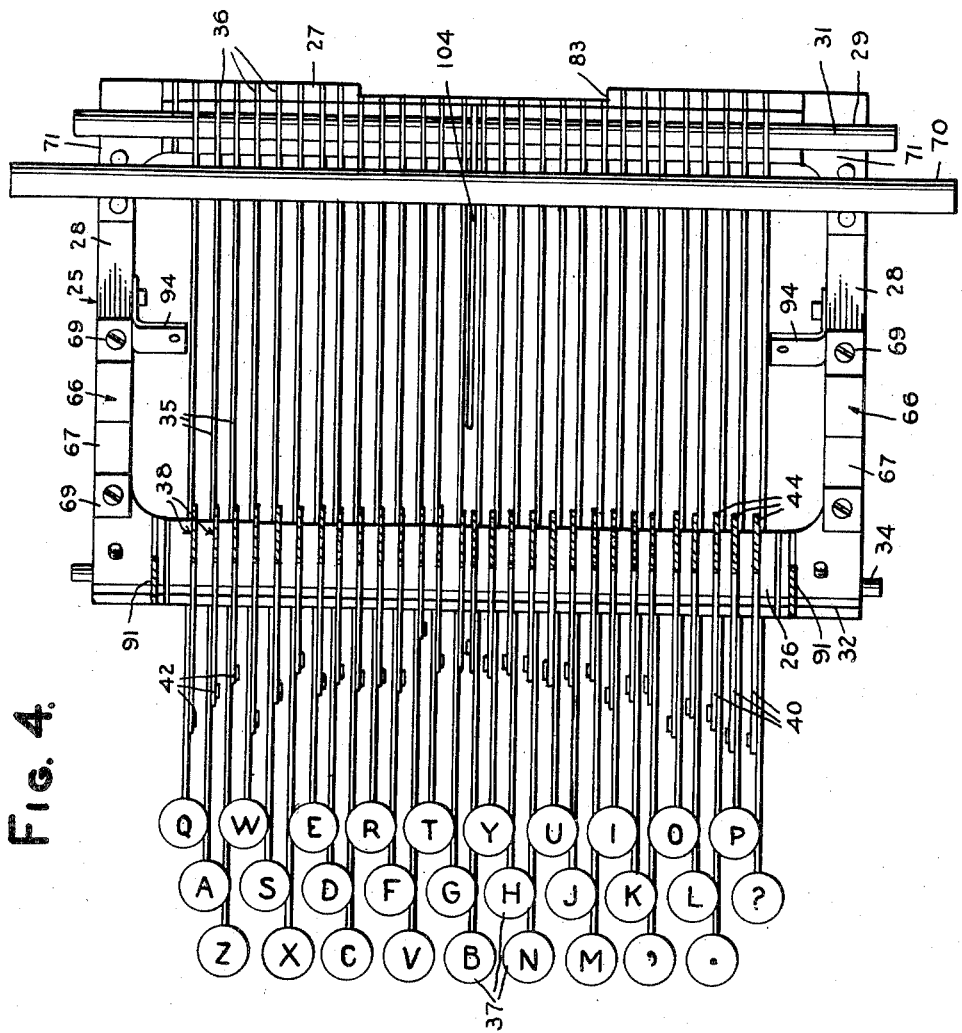
Figure 5:
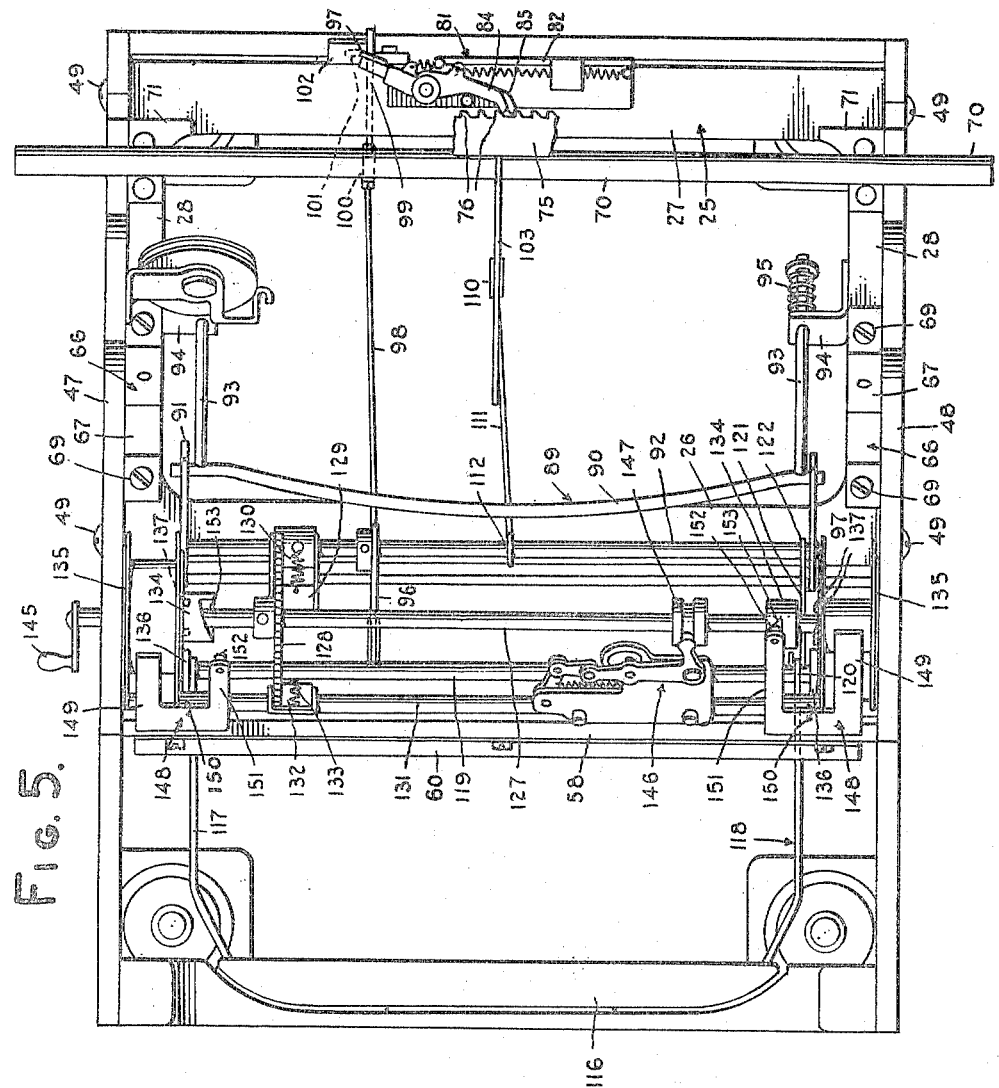
Figure 6:
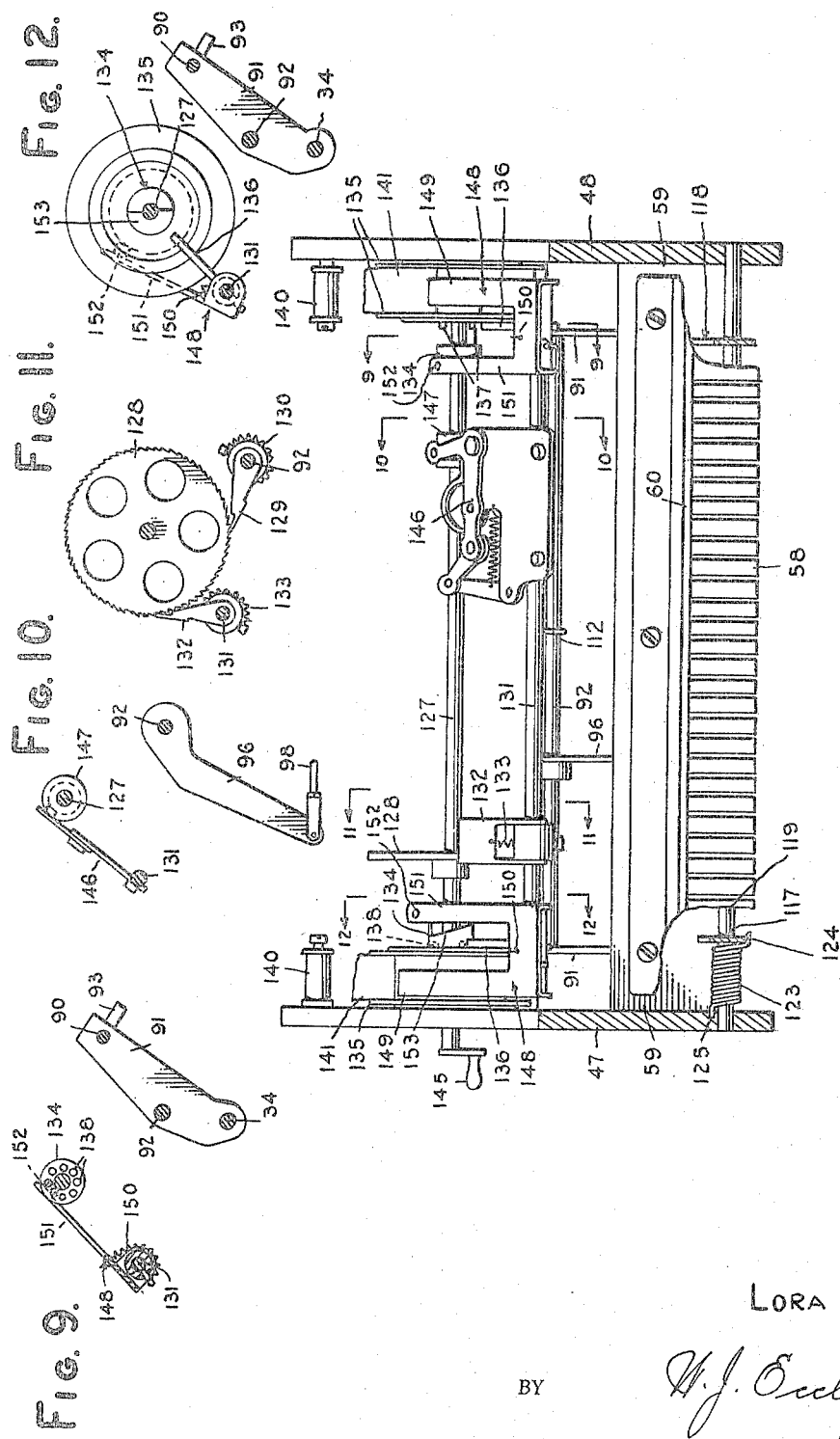
Figure 7:
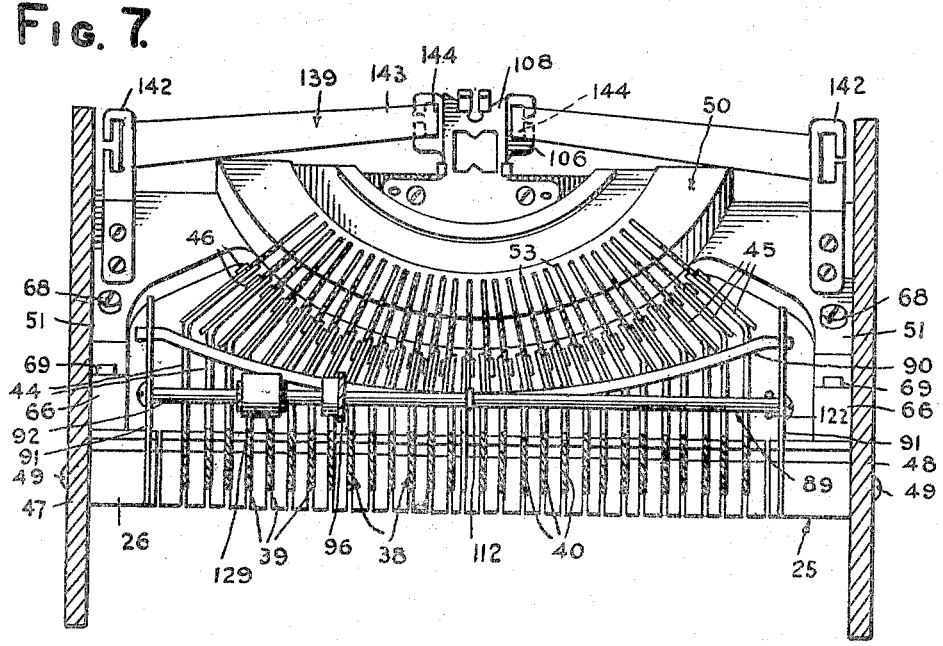
Figure 8:
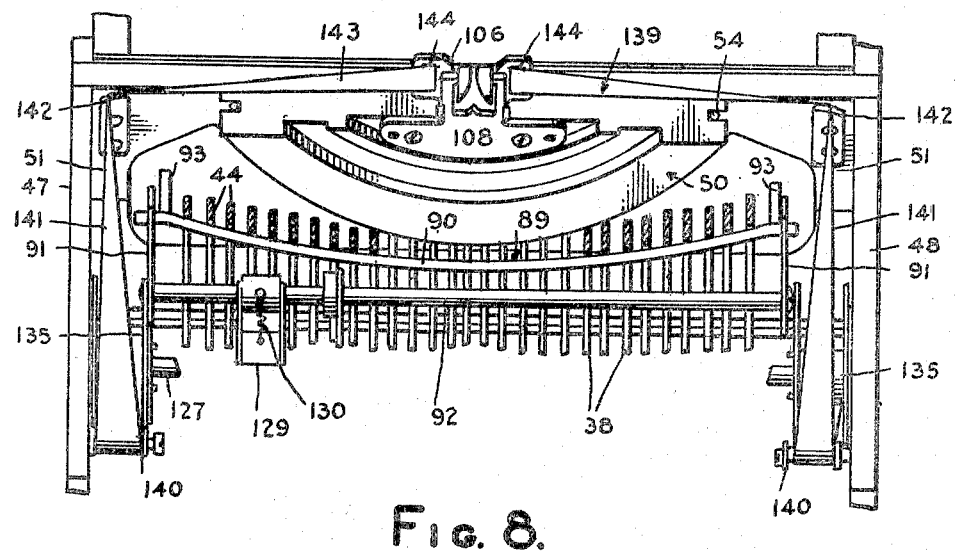

Other objects and advantages of the invention will be apparent during the course of the following description:

In the accompanying drawings, forming a part of this application, and in which like numerals are employed to designate like parts throughout the same, Figure 1 is a side elevation of a typewriter embodying my invention, with one typewriter side removed, Figure 2 is a rear elevation of the same, Figure 3 is a central vertical section taken on line 3—3 of Figure 2, Figure 4 is a plan view of a horizontal support frame and associated elements, with parts omitted and parts in section, Figure 5 is a plan view of a typewriter main frame and associated elements, Figure 6 is a transverse vertical section on line 6—6 of Figure 1, with parts omitted for the purpose of simplification, and parts broken away, Figure 7 is a similar section on line 7—7 of Figure 1 with parts omitted, Figure 8 is a fragmentary plan view of the typewriter with parts omitted, Figure 9 is a fragmentary vertical section on line 9—9 of Figure 6, with parts omitted, Figure 10 is a similar section on line 10—10 of Figure 6, Figure 11 is a similar section on line 11—11 of Figure 6, Figure 12 is a similar section on line 12—12 of Figure 6, Figure 13 is a plan view of the horizontal support frame removed, Figure 14 is a vertical section on line 14—14 of Figure 13, Figure 15 is a plan view of a segment adapter or mounting block removed, Figure 16 is a side elevation of the same, Figure 17 is a fragmentary rear elevation of a segment and associated elements removed, Figure 18 is a plan view of the segment and elements carried thereby, Figure 19 is a front elevation of the segment, Figure 20 is a central vertical section on line 20—20 of Figure 19, Figure 21 is an end elevation of the segment, Figure 22 is a front elevation of the typewriter carriage removed, Figure 23 is a bottom plan view of the carriage, and, Figure 24 is a side elevation, partly diagrammatic, of the horizontal support frame and associated elements.

In the drawings, where for the purpose of illustration is shown a preferred embodiment of my invention, the numeral 25 designates a horizontal rectangular support or mounting frame which is open, and including forward and rear ends 26 and 27 and sides 28. The rear end 27 of the mounting frame 25 has a longitudinal slot 29 formed in its top and leading into a cylindrical bore 30, which receives a key lever fulcrum rod 31, frictionally held therein against rotation but readily removable endwise therefrom. A similar slot 32 is formed in the forward end 26 of the support frame 25 and leads into a cylindrical bore 33, extending entirely across the support frame, and receiving a horizontal sub-lever fulcrum bar 34, having a friction fit therein and held against rotation, but readily removable therefrom. The fulcrum rods 31 and 34 are parallel, and arranged substantially at the same elevation, and the sub-lever fulcrum rod 34 is preferably disposed slightly below the key lever fulcrum rod 31.

I employ a three-lever type bar action, comprising generally horizontal key levers 35 having their rear ends pivotally mounted upon the key lever fulcrum rod 31 and swingable within vertical slots 36 formed in the rear end 27 of the horizontal support frame. The key levers 35 are equipped at their forward ends with the usual key tops 37.

A corresponding number of bell cranks 38 or sub-levers are pivotally mounted upon the sub-lever fulcrum rod 34, and operate in vertical slots 39 formed in the forward end 26 of the horizontal frame 25. The sub-levers 38 have forwardly extending generally horizontal arms 40, provided with slots 41 for receiving rivets or pins 42, secured to top extensions 43 of the key levers 35. The sub-levers 38 further include upwardly and rearwardly inclined arms 44, bent inwardly toward the transverse center of the typewriter for forming converging inclined extensions 45, Figure 7, provided near their upper ends with rivets or pins 46, rigidly secured thereto.

I provide detachable sides 47 and 48 for the typewriter, which may be formed of magnesium, aluminum, or the like, and these sides are rigidly secured to the sides 28 of the horizontal frame 25 by means of screws 49. The sides 47 and 48 extend above the horizontal mounting frame 25 and forwardly thereof as shown in Figures 1 and 3. A type bar segment 50 is arranged above the horizontal mounting frame 25, in an upwardly and rearwardly inclined position, and has depending end extensions 51, integral therewith and rigidly secured at 52 to the sides 47 and 48, as shown. Type bars 53 are pivotally secured to a fulcrum wire 54 carried by the segment 50, and have rear short depending slotted extensions 55 which receive the rivets 46 of the sub-levers 38, so that the sub-levers may operate the type bars 53. The type bars are forwardly and upwardly inclined and arranged substantially perpendicular to the segment 50 when at rest, Figure 1, and an arcuate type bar rest 56 is provided, and spaced forwardly of the segment 50 and rigidly secured thereto by arms 57. The type bar rest 56 is spaced a substantial distance above and somewhat forwardly of the horizontal mounting frame 25.

A transverse horizontal key lever comb 58 is provided, forwardly of the sub-levers 38, and has its opposite ends 59 rigidly secured by screws or the like to the typewriter sides 47 and 48. A key lever stop 60 is rigidly mounted upon the comb 58 in the usual manner for limiting the upward movement of the key levers 35. The key levers 35 are constantly urged upwardly by substantially vertical retractile coil springs 61, which have their lower ends secured at 62 to the key levers, near and forwardly of their rear ends. The upper ends of the springs 61 are detachably secured to a horizontal spring hanger 63, rigidly secured to the back of the segment 50 along the top edge of the same. The springs 61 are arranged substantially at the longitudinal center of the horizontal frame 25.

I also make use of the type bar segment 50 for the mounting of a forward horizontal carriage guide rail or channel 64, rigidly secured within a groove 65 formed in the top of the segment 50, and extending for the entire width of the typewriter, or longer if desired, for accommodating a wider carriage. The forward carriage guide rail 64 is parallel to the fulcrum rods 31 and 34, and in order to assure true and accurate parallelism between the fulcrum rods and guide rail, I mount the segment 50 upon the horizontal frame 25, by means of intermediate adapters or mounting blocks 66. The mounting blocks 66 have accurately machined notches or seats 67 in their tops for receiving the depending extensions 51 of the segment 50, which extensions are rigidly secured to the blocks 66 by screws 68. The adapters 66 are rigidly secured to the frame sides 28 by screws 69, having screw-threaded engagement with the frame sides. A rear and lowermost carriage guide rail 70 is mounted directly upon the horizontal frame 25, near and forwardly of the key lever fulcrum rod 31, and this rear guide rail is spaced a slight distance above the horizontal frame 25 and rigidly connected therewith by end mounting brackets 71. The rear guide rail 70 is horizontal and parallel to the forward guide rail 64, and also parallel with the fulcrum rods 31 and 34. It is to be noted that the several fulcrum rods and carriage guide rails which must be maintained in accurate parallelism are connected directly with the horizontal support frame 25, which constitutes the base or support for all of the critical operating components of the typewriter, and upon which is performed the most important machining and assembly operations connected with the machine.

A carriage 72 is provided and has a forward vertical flange 73, upon which are mounted a plurality of ball bearing rollers 74, having horizontal axles, rigidly secured to the flange 73. The rollers 74 engage and operate within the forward guide rail 64, Figure 3. An escapement rack bar 75 is rigidly secured to the bottom of the carriage 72, adjacent to the rear side of the same, and has rearwardly directed vertical rack teeth 76 for coaction with an escapement, to be described. A truck 77 is rigidly secured to the bottom of the rack bar 75 and includes depending jaws 78, integral therewith, which slidably receive the rear guide rail 70. Ball bearing guide rollers 79 are secured to the carriage 72 upon opposite sides of the truck 77 for engagement with the rear guide rail 70, and the guide rollers 79 serve to guide the carriage smoothly along the rear guide rail 70. The carriage 72 includes a roller 80, and associated paper feed and guide means which need not be described in detail, and which function in a conventional manner during the operation of the typewriter.

An escapement unit 81 for cooperation with the escapement rack bar 75 is bodily removably mounted upon the rear end 27 of the horizontal frame 25. The escapement unit 81 comprises a vertical plate 82, seated within a machined recess 83 in the rear end 27 of the mounting frame 25, at substantially the transverse center of the same. A pair of conventional escapement dogs 84 and 85 are pivotally mounted upon the vertical plate 82 for horizontal swinging movement into and out of engagement with the rack bar 75, to effect a step by step movement of the carriage 72 along the guide rails 64 and 70, as the keys or spacer bar of the typewriter are operated. A main spring 86 is rigidly secured to the side 47 of the typewriter, and has its flexible draw band 87 connected at 88 to the carriage 72, for constantly moving the carriage in one direction so that the same will move in the step by step manner in such direction, as controlled by the escapement.

An important feature of the typewriter resides in the arrangement of a universal bar assembly 89 near the forward sides of the sub-levers 38 and in the space between the key levers 35 and type bars 53, Figures 1 and 3. The universal bar assembly 89 comprises a transverse gradually curved universal bar 90 which is disposed close to the forward inclined sides of the sub-lever arms 44 and extending transversely across all of the sub-levers for engagement therewith. The ends of the universal bar 90 are mounted within openings formed near the upper ends of universal bar levers or cranks 91, having their lower ends pivotally secured to the sub-lever fulcrum rod 34, Figures 1 and 3, at points laterally outwardly of the outermost sub-levers 38 and near the sides 28 of the horizontal frame 25.

A straight horizontal transverse universal tie bar 92 has its ends secured to the universal bar levers 91, near the lower ends of the same, and below the universal bar 90 and somewhat forwardly thereof, due to the rearward inclination of the levers 91. The universal bar 90 has its ends pivoted to the universal bar levers 91 for rotary movement relative thereto, whereas the universal tie bar 92 may have its ends rigidly secured to the levers 91. Rearwardly and downwardly inclined straight parallel guide rods 93 have their forward ends rigidly secured to the universal bar 90 near the ends of the same, Figure 5, and these guide rods are slidable in openings formed in L-shaped guide brackets 94, rigidly secured to the inner faces of the frame sides 28, near and forwardly of the rear frame end 27. The arrangement is such that when the universal bar 90 moves in response to the operation of any one of the typewriter keys, it will travel in a straight line defined by the guide rods 93. This particular motion is permitted because the ends of the universal bar 90 are pivoted to the levers 91. The universal tie bar 92 travels through an arc with the levers 91, since it is rigidly secured to them. Bumper springs 95 are carried by the rear ends of the guide rods 93, and these springs engage the brackets 94 and are compressed when the universal bar 90 is at the forward limit of its travel, and the springs 95 serve to start or project the universal bar 90 toward its rearward position next to the sub-levers 38.

Whenever any one of the typewriter keys is operated, and the corresponding sub-lever 38 is actuated, it is necessary that the universal bar 90 travel through the same linear distance for transmitting the same degree of motion through the levers 91 to the universal tie bar 92. Since the other operating parts of the typewriter which function whenever a letter is typed must operate in an identical manner for every letter or character on the keyboard, each sub-lever 38 has a different length, and accordingly the curvature of the universal bar 90 is such that each sub-lever causes the universal bar to travel through the same linear distance. The inclined arm 44 of each sub-lever 38 travels through an arc of a different length from every other sub-lever, from the center of the keyboard outwardly in both directions.

A depending crank 96 is rigidly mounted upon the universal tie bar 92 in longitudinal alignment with a trip plate 97 of the escapement unit 81, and the crank 96 extends downwardly between an adjacent pair of the sub-levers 38 and has its lower end terminating below the key levers 35 and somewhat forwardly of the frame 25, Figure 3. A substantially horizontal connecting rod 98 has its forward end pivotally secured to the lower end of the depending crank 96, and its rear end pivotally secured to the lower end of an escapement operating lever 99, below the rear end 27 of the frame 25, as indicated at 100. The escapement operating lever 99 is pivoted at 101 to a stationary mounting block 102, which is rigidly secured to the rear end 27 of the mounting frame 25. The escapement operating lever 99 is adapted to swing in a vertical plane, and the upper end of this lever swings forwardly whenever any key or the spacer bar of the typewriter is depressed. The upper end of the lever 99 contacts the trip plate 97 and swings the same forwardly, for releasing either of the pivoted escapement dogs 84 or 85 which happens to have its trailing end in alignment with the trip plate. The escapement dogs referred to are preferably identical with the dogs disclosed in U. S. Patent No. 1,994,544, and these dogs operate in an identical manner for releasing the carriage 72 to travel in a step by step manner in response to the pull exerted by the main spring 86.

A ribbon lift bell crank 103 is pivoted to the key lever fulcrum rod 31 at the longitudinal center of the same and between an adjacent pair of the key levers 35. The bell crank 103 has its forwardly projecting arm 104 inclined upwardly and extending between an adjacent pair of the springs 61, as shown. The forward end of the arm 104 terminates just rearwardly of the segment 50, Figure 3, and is pivotally connected by a pin or the like with a depending extension 105 of a ribbon vibrator or guide 106. The ribbon vibrator 106 operates within a slot 107 formed in the top of the segment 50, Figure 3. The ribbon vibrator slidably engages a type guide 108 of conventional construction. The bell crank 103 also has a depending arm 109 which projects below the key levers 35 and has its lower end pivoted at 110 to the rear end of a forwardly and upwardly extending pull rod 111, having its forward end bent to form a hook 112 engaging about the universal tie bar 92, the pull rod 111 passing between an adjacent pair of the sub-levers 38 and being spaced below the universal bar 90, so as not to interfere with the operation thereof. It is thus evident that whenever a key of a typewriter or the spacer bar is depressed, forward movement of the universal tie bar 92 will cause the pull rod 111 to swing the arm 104 clockwise and upwardly, Figure 3, for elevating the ribbon vibrator 106 in properly timed sequence with the key action and escapement. A retractile coil spring 113 has its forward end connected with the depending arm 109 at 114, and its rear end secured to a pin 115 or the like, carried by the bottom of the rear frame end 27. The spring 113 returns the bell crank 103 to the lowered position when the particular key is released and the universal tie bar 92 again moves rearwardly under the influence of the bumper springs 95.

A spacer bar 116 is carried by a forwardly projecting substantially horizontal arm 117 and bell crank 118, rigidly secured to a horizontal transverse rock shaft 119, arranged below the key levers 35 and having its ends journalled in openings in the removable typewriter sides 47 and 48. An upwardly projecting arm 120 of the bell crank 118 is arranged outwardly of the outermost key lever 35, and has its upper end pivotally secured to a pull rod 121, the rear end of which is bent to form a hook 122 engaging over the universal tie bar 92 for pulling the same forwardly when the spacer bar 116 is depressed. A torsional spring 123 is mounted upon one outer end of the rock shaft 119, and has one end extension 124 engaging under the adjacent arm 117 and another end extension 125 engaging in a small opening in the adjacent typewriter side 47. This spring serves to return the spacer bar 116 to the normal elevated position, wherein upstanding stop extensions 126 of the arm 117 and bell crank 118 engage the stop element 60, Figures 1 and 3. When the spacer bar 116 is depressed, the universal tie bar 92 is pulled forwardly and the ribbon vibrator 106 and escapement 81 are operated in properly timed sequence.

A ribbon drive and shifter shaft 127 is arranged horizontally above and forwardly of the universal tie bar 92 and parallel therewith, and has its ends journalled in openings formed in the typewriter sides 47 and 48. The shaft 127 is arranged in the space between the type bars 53 and the key levers 35, as shown. The shaft 127 has a toothed ratchet wheel 128 rigidly mounted thereon for rotation therewith, and this ratchet wheel is driven in a step by step manner by a driving pawl 129, pivotally secured to the universal tie bar 92 in alignment with the ratchet wheel 128. The driving pawl 129 is resiliently held in engagement with the ratchet wheel by a spring 130. The driving pawl 129 is substantially wider than the ratchet wheel 128, so as to remain in engagement therewith when the ratchet wheel shifts axially with the shaft 127 in a manner to be described.

An additional non-rotatable horizontal transverse shaft 131 is arranged below and somewhat forwardly of the shaft 127 and substantially at the elevation of the universal tie bar 92. The ends of this non-rotatable shaft are secured within openings in the typewriter sides 47 and 48. A ratchet wheel braking or holding pawl 132 is pivotally mounted upon the non-rotatable shaft 131 and urged by a spring 133 into contact with the ratchet wheel 128. The pawl 132 is substantially wider than the ratchet wheel 128 so as to engage the same in all shifted positions of the latter.

Ribbon reversing cams or clutch elements 134 are rigidly secured to the ribbon drive shaft 127, near and inwardly of its ends, and ribbon spools 135 are rotatably mounted upon the shaft 127 outwardly of the elements 134 and between the same and the typewriter sides 47 and 48, Figure 6. The shaft 127 is bodily shiftable axially with respect to the spools 135, which are held against axial shifting by radial stop pins 136, rigidly mounted upon the non-rotatable shaft 131 and engaging the inner sides of the vertically disposed spools 135, which are held captive between the pins 136 and the typewriter sides 47 and 48. The ribbon spools 135 are provided upon their inner sides with pairs of short axially extending lugs or pins 137, engageable within openings 138 formed in the outer ends of the elements 134. The spacing of the elements 134 axially from the ribbon spools 135 is such that when one pair of pins 137 engages the openings 138 of one element 134, the pins 137 of the other ribbon spool are out of engagement with the other element 134. The ribbon spools 135 may form permanent parts of the typewriter, and are not intended to be changed with every ribbon. The ribbon 139 is wound upon the spools 135 in the usual manner, and passes over small guide rollers 140, carried by the typewriter sides 47 and 48, and spaced above and forwardly of the spools 135, Figures 1 and 3. The ribbon 139 then extends rearwardly in a pair of horizontal runs 141 near the typewriter sides 47 and 48, and then through a pair of slotted guides 142, mounted upon the upper corners of the type bar segment 50, at substantially the elevation of the rollers 140. The ribbon then extends in a substantially horizontal transverse run 143 above the top of the segment 50 and through slots 144 of the ribbon vibrator 106.

I provide manual and automatic means to shift the ribbon drive shaft 127 axially and thereby reverse the ribbon. The manual means comprises a small crank 145 rigidly secured to one end of the shaft 127 and disposed exteriorly of the adjacent side 47. This crank is used to rotate the shaft 127 and to shift the same axially for engaging and disengaging the pins 137 from the respective clutch elements 134. A conventional spring-loaded toggle device 146 is secured to the non-rotatable shaft 131 and cooperates with a grooved collar 147, fixedly secured to the shaft 127 for positioning the same in either of its two axially adjusted positions. The device 146 serves merely to prevent the shaft 127 from assuming an intermediate position out of positive engagement with both spools 135, which would be undesirable.

The automatic ribbon reversing means comprises a pair of forked followers 148 or feeler devices, pivotally mounted upon the non-rotatable shaft 131 and straddling the stop pins 136 and the inner sides or discs of the spools 135, Figure 6. One arm 149 of each forked follower 148 rides upon the periphery of the ribbon wound upon the adjacent spool 135, and is raised and lowered by the bulk of the ribbon on the particular spool. A small spring 150 connected with each forked follower 148 holds the same in constant engagement with the periphery of the ribbon on the spool. The innermost arm 151 of each follower 148 extends over the adjacent element 134 and is provided at its inner end with a short depending pin 152 which shifts downwardly into engagement with a spiral cam surface 153 formed upon the inner end of each element 134. This engagement occurs when the particular ribbon spool has the ribbon upon it nearly exhausted or unwound, so that the forked follower 148 is lowered and the pin 152 engages the cam surface 153. At this time, the other spool 135 will have most of the ribbon wound upon it, and the associated arm 149 will be elevated by the periphery of the ribbon, so that the adjacent arm 151 and pin 152 are elevated and out of engagement with the corresponding element 134.

When the particular fork follower 148 is lowered into engagement with the associated cam element 134, the spiral cam face 153 engages the pin 152 of the follower as the ribbon drive shaft 127 rotates in a step by step manner due to the operation of the keys. The shaft 127 is shifted axially in the direction causing the pins 137 of the nearly exhausted ribbon spool 135 to engage the openings 138 of the adjacent element 134, as the shaft 127 is shifted axially. The reverse action occurs when the other ribbon spool 135 is nearly exhausted and the other follower 148 moves downwardly into engagement with the other cam element 134. When this occurs the shaft 127 is shifted axially in the opposite direction for engaging and driving the other ribbon spool, through the cooperation of the pins 137 of subject spool with openings 138 of the adjacent element 134. In all axially adjusted positions of the shaft 127, the same has rotary movement imparted thereto by the driving pawl 129 which is wide enough to remain in engagement with the ratchet wheel 128.

It is to be understood that the form of the invention herewith shown and described is to be taken as a preferred example of the same, and that various changes in the shape, size and arrangement of parts may be resorted to, without departing from the spirit of the invention or the scope of the subjoined claims.

I claim:

1. A typewriter comprising a substantially horizontal support member, typewriter sides secured to the support member and supporting the same spaced above the bottom of the typewriter, a key lever fulcrum rod secured to the support member near the rear end thereof, key levers pivotally connected with the key lever fulcrum rod, a sub-lever fulcrum rod secured to the support frame near the forward end thereof, sub-levers pivotally connected with the sub-lever fulcrum rod and connected with the key levers to be operated thereby, a member mounted upon the substantially horizontal support member between the key lever and sub-lever fulcrum rods, type bars pivotally secured to the last-named member and connected with the sub-levers to be operated thereby, an escapement unit secured to the rear of said substantially horizontal member, universal mechanism pivotally connected with the sub-lever fulcrum rod and arranged forwardly of the sub-levers for engagement therewith when the key levers are depressed, ribbon drive means arranged near said universal mechanism and connected therewith so that movement of the universal mechanism will operate the ribbon drive means, means connecting the universal mechanism and escapement unit for operating the latter in timed sequence with said ribbon drive means, ribbon vibrator means carried by the last-named member and connected with said universal mechanism to be operated in timed sequence with the escapement unit and ribbon drive means, a carriage guide rail mounted upon said substantially horizontal support member rearwardly of the second-named member, the second-named member having a part forming a second carriage guide rail, and a carriage engaging the first and second guide rails for step by step movement therealong in response to operation of the key levers and escapement unit.

2. In a typewriter, a substantially horizontal rectangular support member, typewriter sides secured to the support member and maintaining the same elevated above the bottom of the typewriter, a first carriage guide rail mounted upon the support member near the rear end of the same, a type bar segment mounted upon the support member forwardly of the first carriage guide rail, a second carriage guide rail secured to the type bar segment and spaced above and forwardly of the first carriage guide rail, key levers and sub-levers pivotally connected with the support member and connected with each other, type bars pivotally secured to the type bar segment and connected with the sub-levers to be operated thereby, and a universal bar pivotally connected with said support member and arranged near the sub-levers for engagement therewith and adapted to operate ribbon feed and escapement means in timed sequence with the operation of the typewriter key levers.

3. In a typewriter, a substantially horizontal rectangular support frame, typewriter sides secured to the support frame, and supporting the same above the bottom of the typewriter, a type bar segment extending transversely of and above the support frame and having its ends mounted upon the sides of the support frame, a first carriage guide rail secured to the top of the type bar segment, a second carriage guide rail mounted upon the support frame rearwardly of the type bar segment and spaced below the first carriage guide rail, key levers having their rear ends pivotally secured to the support frame near the rear end of the latter and extending forwardly of the support frame, sub-levers pivotally secured to the support frame near the forward end thereof and operatively connected with the key levers, and type bars pivotally mounted upon the type bar segment and operatively connected with said sub-levers.

4. In a typewriter, a substantially horizontal open support frame having sides and forward and rear ends, generally horizontal key levers having their rear ends pivoted to the rear end of the support frame and extending through the open support frame and forwardly thereof, generally L-shaped sub-levers pivoted to the forward end of the support frame and operatively connected with the key levers, a type bar segment mounted upon the sides of the support frame and extending above the support frame between the forward and rear ends of the same, type bars pivotally mounted upon the type bar segment and operatively connected with the sub-levers, and a universal bar arranged near the sub-levers and pivotally secured to the support frame and adapted to be engaged by the sub-levers for operating ribbon feed and escapement means.

5. In a typewriter, a substantially horizontal support member, key levers and sub-levers pivotally connected with the support member and being operatively connected, a type bar segment mounted upon the support frame, type bars pivotally connected with the type bar segment and connected with the sub-levers, a universal member pivotally connected with the support member and arranged near the forward sides of the sub-levers and adapted to be engaged thereby, typewriter sides connected with the support member and extending above the same, a ribbon drive shaft journalled upon the typewriter sides and arranged forwardly of said universal member, means connecting the universal member and said drive shaft so that the drive shaft is turned in a step by step manner by the universal member when the key levers are operated, escapement means mounted upon the support member, and a linkage connecting the escapement means and universal member.

6. In a typewriter, a substantially horizontal support member, typewriter sides connected with the support member and supporting the same, a type bar segment mounted upon the support member and extending above the same, generally horizontal key levers pivoted to the support member and extending forwardly thereof, generally L-shaped sub-levers pivoted to the support member and including arms projecting above the support member adjacent to the type bar segment, type bars pivoted to the type bar segment and connected with said arms of the sub-levers and spaced above the sub-levers and key levers, a universal bar pivotally mounted upon the support member and arranged near the forward sides of said arms and between the sub-levers and type bars, a substantially horizontal transverse ribbon drive shaft journalled upon the typewriter sides forwardly of the universal bar and arranged between the type bars and sub-levers, means connecting the universal bar and said drive shaft for turning the drive shaft in a step by step manner when the key levers are depressed, ribbon spools mounted upon said drive shaft inwardly of the typewriter sides, clutch elements secured to the drive shaft inwardly of the ribbon spools for engagement therewith when the drive shaft is shifted axially with respect to the ribbon spools, and follower elements arranged near the ribbon spools and having parts engaging the ribbon wound upon the spools and parts which are adapted to engage the clutch elements to effect axial movement of the drive shaft when the ribbon is substantially exhausted from one of the ribbon spools, whereby the direction of travel of the ribbon in the typewriter is automatically reversed.

7. In a typewriter, a substantially horizontal support member, typewriter sides secured to the support member and supporting the same, a type bar segment mounted upon the support member and extending above the same, key levers having their rear ends pivoted to the support member near the rear end of the same, sub-levers pivoted to the support member near its forward end and forwardly of the type bar segment, type bars pivoted to the type bar segment and connected with the sub-levers and overlying the sub-levers and key levers, a universal bar extending transversely of and arranged near the sub-levers and disposed between the sub-levers and type bars and pivotally secured to the support member near its forward end, a substantially horizontal transverse ribbon drive shaft journalled upon the typewriter sides forwardly of said universal bar and disposed between the sub-levers and type bars, a ratchet wheel secured to the ribbon drive shaft, and a pawl carried by the universal bar and engaging the ratchet wheel to turn the same step by step when the universal bar is actuated in response to the operation of the key levers.

8. In a typewriter, a substantially horizontal support frame including forward and rear ends and sides, generally horizontal key levers having their rear ends pivoted to the rear end of the support frame and extending downwardly through the support frame and forwardly of the forward end of the support frame, sub-levers pivoted to the forward end of the support frame and connected with the key levers, adapter blocks mounted upon the sides of the support frame rearwardly of the forward end of the same, a type bar segment arranged above the support frame and extending transversely thereof and having ends mounted upon the adapter blocks, type bars pivoted to the type bar segment and connected with the sub-levers, arms pivotally secured to the forward end of the support frame and extending above the same near the sides of the support frame, a universal bar extending transversely of the sub-levers and arranged near the forward sides of the sub-levers and having its ends pivotally secured to said arms, guide elements mounted upon the sides of the support frame rearwardly of the universal bar, guide rods secured to the universal bar and slidably engaging said guide elements for imparting linear movement to the universal bar when the arms are rocked upon their pivots, ribbon drive means arranged forwardly of the sub-levers and universal bar and connected with the universal bar to be driven thereby, and escapement means connected with the universal bar to be operated by movement of the same to release the carriage of the typewriter for step by step movement when the key levers are operated.

9. In a typewriter, a substantially horizontal support member having forward and rear ends and sides, the support member being open between said ends and sides, a key lever fulcrum rod secured to the rear end of the support member and extending transversely thereof, a sub-lever fulcrum rod secured to the forward end of the support member and substantially parallel with the key lever fulcrum rod, adapter blocks mounted upon the sides of the support member between the key lever and sub-lever fulcrum rods and having seats formed therein, a type bar segment arranged above the support member and extending transversely thereof and having ends secured within the seats of the adapter blocks, a first substantially horizontal carriage guide rail secured to the type bar segment and extending transversely of the support member, and a second substantially horizontal carriage guide rail arranged below and rearwardly of the first guide rail and parallel therewith, the second carriage guide rail being secured to the sides of the support member near and forwardly of the rear end of the same.

10. In a typewriter, a substantially horizontal open support member having forward and rear ends and sides, the support member being adapted to be secured to the sides of a typewriter and supported thereby, a substantially horizontal key lever fulcrum rod secured to the rear end of the support member and extending transversely thereof, a substantially horizontal sub-lever fulcrum rod secured to the forward end of the support member and substantially parallel with the key lever fulcrum rod, adapter blocks mounted upon the sides of the support member between the key lever and sub-lever fulcrum rods and provided in their tops with seats, a type bar segment arranged above the support member and extending transversely thereof and having ends secured within the seats of the adapter blocks, a first substantially horizontal carriage guide rail mounted upon the type bar segment and extending transversely of the support member, a second substantially horizontal carriage guide rail mounted upon the support member near the rear end of the same and disposed below and rearwardly of the first guide rail and parallel therewith, generally horizontal key levers having their rear ends pivotally secured to the key lever fulcrum rod and extending downwardly through the open support member and forwardly thereof, springs connected with the key levers and said type bar segment and serving to maintain the key levers elevated, sub-levers pivotally secured to the sub-lever fulcrum rod and operatively connected with the key levers forwardly of said support member, and type bars pivotally secured to said type bar segment and operatively connected with the sub-levers above said support member.

11. In a typewriter, a substantially horizontal support member adapted to be secured to the sides of the typewriter and supported thereby, key levers and sub-levers pivotally mounted upon the support member near the rear and forward ends respectively of the support member, a type bar segment arranged above the support member and extending transversely thereof and having its ends secured to the support member, a first substantially horizontal carriage guide rail secured to the type bar segment and extending transversely of the support member, a second carriage guide rail secured to the support member and arranged below and rearwardly of the first guide rail and being parallel therewith, type bars pivoted to the type bar segment and connected with the sub-levers to be operated thereby, a universal bar arranged above the support member and forwardly of the sub-levers for engagement therewith, arms carrying the universal bar and pivotally connected with the support member and extending above the same, a universal tie bar secured to said arms below said universal bar and extending transversely of the support member, an escapement unit secured to the rear end of the support member and including a pivoted operating lever, a depending arm carried by the universal tie bar and arranged forwardly of said support member and extending below the same, and a connecting rod secured to said operating lever and said depending arm and arranged beneath the support member for longitudinal movement when the universal tie bar is operated in response to movement of the sub-levers.

12. In a typewriter, a substantially horizontal support member to be secured to the sides of the typewriter, a key lever fulcrum rod secured to the support member near the rear end thereof, a sub-lever fulcrum rod secured to the support member near the forward end thereof and arranged parallel to the key lever fulcrum rod, key levers and sublevers pivoted respectively to the key lever and sub-lever fulcrum rods, a universal bar device arranged above the support member and adapted to be engaged by the sub-levers, arms carrying the universal bar device and pivotally secured to the sub-lever fulcrum rod, a type bar segment mounted upon said support member between said key lever and sub-lever fulcrum rods, a ribbon vibrator carried by the type bar segment for reciprocation relative thereto, a bell crank pivotally secured to the key lever fulcrum rod and including first and second arms, the first arm being connected with the ribbon vibrator for operating the same, an element connecting the second arm of said bell crank and said universal bar device, so that movement of the latter in response to operation of the sub-levers will cause the ribbon vibrator to operate, an escapement unit mounted upon the support member near the rear end thereof and having a pivoted operating part extending below said support member, a depending arm secured to the universal bar device and extending below said support member, and a rod arranged below the support member and connecting the depending arm and said pivoted operating part of the escapement unit.

13. In a typewriter, a substantially horizontal support member for arrangement between the sides of the typewriter, a substantially horizontal transverse key lever fulcrum rod secured to the support member near the rear end of the same, a sub-lever fulcrum rod secured to the support member near its forward end and parallel with the key lever fulcrum rod, key levers pivoted to the key lever fulcrum rod and extending forwardly of the support member, generally L-shaped sub-levers pivoted to the sub-lever fulcrum rod and connected with the key levers forwardly of said support member, the sub-levers having arms extending above said support member, a universal bar arranged above the support member and forwardly of said arms of the sub-levers for engagement therewith and extending transversely of the sub-levers, upstanding arms pivotally connected with the sub-lever fulcrum rod and projecting above the support member and provided near their upper ends with openings pivotally receiving the ends of the universal bar, guide rods rigidly secured to the universal bar and extending rearwardly thereof, fixed guide elements secured to the support member and slidably engaging said guide bars, and a universal tie bar rigidly secured to said upstanding arms below said universal bar and extending generally parallel with the universal bar and adapted to operate ribbon drive and escapement means of the typewriter.

14. In a typewriter, a pair of typewriter sides, a substantially horizontal ribbon drive shaft rotatably mounted upon the typewriter sides, a ratchet wheel secured to the ribbon drive shaft for rotation therewith, a rockable universal bar device arranged near one side of the ribbon drive shaft, a driving pawl carried by the universal bar device and engaging the ratchet wheel to turn the same step by step, ribbon spools journalled upon the ribbon drive shaft near and inwardly of the typewriter sides and having inwardly projecting clutch elements, the ribbon drive shaft being axially shiftable and rotatable with respect to the ribbon spools, a second substantially horizontal fixed shaft arranged near the other side of the ribbon drive shaft, a holding pawl mounted upon the fixed shaft and engaging the ratchet wheel to prevent counter-rotation of the same, stop elements secured to the fixed shaft and engaging the inner sides of the ribbon spools to hold the same captive between the stop elements and typewriter sides, cam elements secured to the ribbon drive shaft inwardly of the ribbon spools and having openings to receive the clutch elements of the ribbon spools, and followers connected with the fixed shaft near the ribbon spools and having parts contacting the peripheries of the ribbon spools and parts movable into engagement with said cam elements for effecting the axial shifting and automatic reversing of the ribbon drive shaft when the ribbon on either of the spools is nearly exhausted.

15. In a typewriter, a pair of typewriter sides, a substantially horizontal main support member arranged between the sides and secured thereto, a sub-lever fulcrum rod secured to the main support member, a universal bar device rockably secured to the sub-lever fulcrum rod, a substantially horizontal rotatable and axially shiftable ribbon drive shaft journalled upon the typewriter sides near and forwardly of said universal bar device, a ratchet wheel secured to the ribbon drive shaft for rotation therewith, a driving pawl carried by the universal bar device and engaging the ratchet wheel in all axially shifted positions of the ribbon drive shaft for turning the same step by step, ribbon spools journalled upon the ribbon drive shaft inwardly of the typewriter sides, means engaging the ribbon spools to prevent the same from shifting axially with the ribbon drive shaft, elements secured to the ribbon drive shaft near the ribbon spools and adapted to engage the ribbon spools for coupling the same to the ribbon drive shaft, and means for engagement with said elements to effect the axial shifting of the ribbon drive shaft and reversal of the direction of feed of the ribbon when the ribbon on either ribbon spool is nearly exhausted.

16. In a typewriter, a pair of typewriter sides, a substantially horizontal axially shiftable and rotatable ribbon drive shaft mounted upon the typewriter sides, means connected with the ribbon drive shaft to turn the same in a step by step manner, ribbon spools freely rotatably mounted upon the ribbon drive shaft inwardly of the typewriter sides, a second substantially horizontal shaft fixedly secured to the typewriter sides and spaced from the ribbon drive shaft, stop elements secured to the second shaft and extending near the inner sides of the ribbon spools to hold the spools against axial movement with the ribbon drive shaft, combined clutch and cam elements secured to the ribbon drive shaft inwardly of the ribbon spools and shiftable axially with the ribbon drive shaft into positive driving engagement with the ribbon spools so that either ribbon spool may be caused to turn with the ribbon drive shaft, and forked follower devices mounted upon the second shaft and having arms contacting the ribbon wound upon the ribbon spools and arms adjacent to the combined elements and adapted to be lowered into engagement with the elements when the ribbon on either spool is substantially exhausted.

17. In a typewriter, a pair of typewriter sides, a substantially horizontal axially shiftable and rotatable ribbon drive shaft mounted upon the typewriter sides, means connected with the ribbon drive shaft to turn the same in a step by step manner in response to the operation of the keys of the typewriter, a pair of ribbon spools rotatably mounted upon the ribbon drive shaft near and inwardly of the typewriter sides, pins secured to the inner sides of the ribbon spools and projecting axially inwardly thereof, combined clutch and cam elements secured to the ribbon drive shaft inwardly of the ribbon spools and having openings in their outer ends adapted to receive the pins of the ribbon spools so that either ribbon spool can be locked in positive driving engagement with the ribbon drive shaft when such shaft is shifted axially, said elements being further provided with spiral cam surfaces, a fixed supporting member arranged near and spaced from the ribbon drive shaft, a pair of generally U-shaped follower elements pivotally connected with the fixed supporting member and having corresponding sides riding on the peripheries of the ribbon wound upon the spools, the other sides of said U-shaped follower elements being arranged over said combined clutch and cam elements, pins secured to said other sides of the U-shaped follower elements and adapted to be lowered into engagement with said spiral cam surfaces when the ribbon is nearly exhausted from the ribbon spools, and stop means engaging the inner sides of the ribbon spools to prevent the same from shifting axially with the ribbon drive shaft.

18. In a typewriter, a pair of typewriter sides, a substantially horizontal axially shiftable and rotatable ribbon drive shaft mounted upon the typewriter sides, means connected with the ribbon drive shaft to turn the same step by step when the keys of the typewriter are operated, ribbon spools rotatably mounted upon the ribbon drive shaft, means to prevent the ribbon spools from moving axially with the ribbon drive shaft, combined clutch and cam elements secured to the ribbon drive shaft near the ribbon spools and shiftable axially with the drive shaft into driving engagement with the ribbon spools so that they may be caused to rotate with the ribbon drive shaft, and means rockably mounted upon the typewriter near the ribbon drive shaft and contacting the peripheries of the ribbon wound upon the ribbon spools and shiftable into engagement with the combined clutch and cam elements to effect the axial shifting of the ribbon drive shaft and reversal of the direction of feed of the ribbon when the ribbon wound upon one of the ribbon spools is nearly exhausted.

19. In a typewriter, a substantially horizontal rectangular support member, typewriter sides secured to the support member and maintaining the same elevated above the bottom of the typewriter, a type bar segment mounted upon the support member and having a part serving as a first carriage guide, key levers and sub-levers pivotally connected with the support member and connected with each other, type bars pivotally secured to the type bar segment and connected with the sub-levers to be operated thereby, a universal bar pivotally connected with the support member near the sub-levers for engagement therewith and adapted to operate ribbon feed and escapement means in timed sequence with the operation of the typewriter key levers, and means forming a second carriage guide mounted upon the support member in spaced relation to said type bar segment.

References Cited in the file of this patent

UNITED STATES PATENTS

| Number | Name | Date |
|---|---|---|
| 968,674 | Mallman | Aug. 30, 1910 |
| 1,015,373 | Yaw | Jan. 23, 1912 |
| 1,029,324 | Sholes | June 11, 1912 |
| 1,326,474 | Briggs | Dec. 30, 1919 |
| 1,455,519 | Barr | May 15, 1923 |
| 2,326,312 | Thompson | Aug. 10, 1943 |

FOREIGN PATENTS

| Number | Country | Date |
|---|---|---|
| 304,404 | Germany | Mar. 12, 1918 |